(12) United States Patent
Lippey et al.

(10) Patent No.: US 10,809,543 B2
(45) Date of Patent: Oct. 20, 2020

(54) GLASSES FOR SPECTRAL AND 3D IMAGING

(71) Applicant: Dolby Laboratories Licensing Corporation, San Francisco, CA (US)

(72) Inventors: Barret Lippey, Foster City, CA (US); Martin J. Richards, Gig Harbor, WA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 140 days.

(21) Appl. No.: 15/877,755

(22) Filed: Jan. 23, 2018

(65) Prior Publication Data

US 2018/0210217 A1 Jul. 26, 2018

Related U.S. Application Data

(60) Provisional application No. 62/449,477, filed on Jan. 23, 2017.

(51) Int. Cl.
| | |
|---|---|
| *G02B 27/22* | (2018.01) |
| *G02B 30/23* | (2020.01) |
| *G02B 5/28* | (2006.01) |
| *H04N 13/332* | (2018.01) |
| *G03B 35/26* | (2006.01) |

(Continued)

(52) U.S. Cl.
CPC ............. *G02B 30/23* (2020.01); *G02B 5/285* (2013.01); *G03B 35/26* (2013.01); *H04N 13/332* (2018.05); *G02B 5/22* (2013.01); *G03B 21/2033* (2013.01); *H04N 13/133* (2018.05); *H04N 13/334* (2018.05)

(58) Field of Classification Search
CPC .. G02B 27/2207; G02B 27/2264; G02B 5/22; G02B 5/26; G02B 5/285–288; G02B 21/22; G02B 1/116; H04N 13/334; H04N 13/133; H04N 13/332; H04N 13/398; H04N 13/305; H04N 13/324; H04N 13/122; H04N 13/161; H04N 13/194; H04N 13/363; H04N 13/302; H04N 13/337; H04N 13/341; H04N 13/388; H04N 13/286; H04N 13/361; G03B 21/2033
USPC ................... 359/464, 722, 885–887; 351/44; 349/106; 514/770, 769; 524/440; 106/403, 404
See application file for complete search history.

(56) References Cited

U.S. PATENT DOCUMENTS

| | | |
|---|---|---|
| 1,986,966 A | 1/1935 | Godwin |
| 1,993,272 A | 3/1935 | Godwin |

(Continued)

FOREIGN PATENT DOCUMENTS

| | | |
|---|---|---|
| CN | 2045120 | 9/1989 |
| DE | 19808264 | 11/1998 |

(Continued)

*Primary Examiner* — Mustak Choudhury

(57) ABSTRACT

3D glasses include an absorptive layer in a single lens of the glasses. The absorptive layer may be specifically tailored for spectral separation characteristics of a 3D filter portion of the lens. The absorptive layer may be combined with, and work in conjunction with, interference layers of a lens while also operating separately as an absorber. The absorptive layer may include biometric variations and/or positive runout. The absorptive layer may selectively absorb more of one color than other colors. A balancing absorber may be included in an opposite eye channel.

13 Claims, 3 Drawing Sheets

(51) Int. Cl.
*G02B 5/22* (2006.01)
*G03B 21/20* (2006.01)
*H04N 13/133* (2018.01)
*H04N 13/334* (2018.01)

(56) References Cited

U.S. PATENT DOCUMENTS

| | | |
|---|---|---|
| 3,962,062 A | 6/1976 | Ingrey |
| 4,134,644 A | 1/1979 | Marks |
| 4,189,210 A | 2/1980 | Browning |
| 4,247,177 A | 1/1981 | Marks |
| 4,431,265 A | 2/1984 | Benton |
| 4,705,356 A | 11/1987 | Berning |
| 4,705,371 A | 11/1987 | Beard |
| 4,740,836 A | 4/1988 | Graig |
| 4,914,510 A | 4/1990 | Brennesholtz |
| 4,937,134 A | 6/1990 | Schrenk |
| 4,965,135 A | 10/1990 | Im |
| 5,140,464 A | 8/1992 | Kyogoku |
| 5,218,386 A | 6/1993 | Levien |
| 5,260,773 A | 11/1993 | Dischert |
| 5,537,476 A | 7/1996 | Coteus |
| 5,614,920 A | 3/1997 | Coteus |
| 5,619,219 A | 4/1997 | Coteus |
| 5,867,316 A | 2/1999 | Carlson |
| 6,142,624 A | 11/2000 | Morris |
| 6,175,371 B1 | 1/2001 | Schoulz |
| 6,242,752 B1 | 6/2001 | Soma |
| 6,283,597 B1 | 9/2001 | Jorke |
| 6,698,890 B1 | 3/2004 | Jorke |
| 6,777,070 B1 | 8/2004 | Murata |
| 6,847,483 B2 | 1/2005 | Lippey |
| 6,850,352 B1 | 2/2005 | Childers |
| 6,867,775 B2 | 3/2005 | Buck |
| 6,943,852 B2 | 9/2005 | Divelbiss |
| 7,001,021 B2 | 2/2006 | Jorke |
| 7,136,210 B2 | 11/2006 | Harper |
| 7,164,535 B2 | 1/2007 | Hall |
| 7,241,014 B2 | 7/2007 | Lippey |
| 7,273,282 B2 | 9/2007 | Przybyla |
| 7,602,108 B2 | 10/2009 | Shelby |
| 7,636,193 B2 | 12/2009 | Bellanca |
| 7,686,455 B2 | 3/2010 | Yoshimura |
| 7,784,938 B2 | 8/2010 | Richards |
| 7,832,869 B2 | 11/2010 | Maximus |
| 7,959,295 B2 | 6/2011 | Richards |
| 7,995,092 B2 | 8/2011 | Lippey |
| 8,403,489 B2 | 3/2013 | Richards |
| 8,411,137 B2 | 4/2013 | Jacobs |
| 8,459,796 B2 | 6/2013 | Richards |
| 8,480,234 B2 | 7/2013 | Richards |
| 8,503,078 B2 | 8/2013 | Richards |
| 8,537,463 B2 | 9/2013 | Richards |
| 8,596,794 B2 | 12/2013 | Jacobs |
| 8,786,940 B2 | 7/2014 | Lippey |
| 8,928,970 B2 | 1/2015 | Arntsen |
| 8,988,765 B2 | 3/2015 | O'Hara |
| 9,146,402 B2 | 9/2015 | Richards |
| 9,313,482 B2 | 4/2016 | Lippey |
| 9,335,541 B2 | 5/2016 | Silverstein |
| 9,335,614 B2 | 5/2016 | Richards |
| 9,478,193 B2 | 10/2016 | Richards |
| 9,547,179 B2 | 1/2017 | Richards |
| 9,599,835 B2 | 3/2017 | Lippey |
| 9,696,558 B2 | 7/2017 | Richards |
| 9,715,123 B2 | 7/2017 | Arntsen |
| 2003/0086601 A1 | 5/2003 | Lee |
| 2004/0233524 A1 | 11/2004 | Lippey |
| 2005/0036119 A1 | 2/2005 | Ruda |
| 2005/0225630 A1 | 10/2005 | Childers |
| 2005/0231800 A1 | 10/2005 | Lippey |
| 2006/0011617 A1 | 1/2006 | Covarrubias |
| 2007/0127121 A1 | 6/2007 | Maximus |
| 2007/0236617 A1 | 10/2007 | Lippey |
| 2007/0236809 A1 | 10/2007 | Lippey |
| 2007/0247709 A1 | 10/2007 | Karakawa |
| 2008/0151193 A1 | 6/2008 | Reder |
| 2008/0158672 A1 | 7/2008 | McCosky |
| 2008/0278574 A1 | 11/2008 | Ramstad |
| 2010/0066813 A1 | 3/2010 | Jorke |
| 2014/0285770 A1 | 9/2014 | Richards |
| 2016/0168386 A1* | 6/2016 | Aizenberg ............... C09C 1/62 514/770 |
| 2017/0068028 A1* | 3/2017 | Sullivan ................ G02B 5/285 |
| 2017/0285230 A1* | 10/2017 | Koga ...................... G02B 5/22 |

FOREIGN PATENT DOCUMENTS

| | | |
|---|---|---|
| DE | 10057102 | 5/2002 |
| DE | 10249815 | 5/2004 |
| DE | 10359788 | 4/2005 |
| EP | 0123748 | 11/1984 |
| EP | 2116067 | 11/2009 |
| JP | S62-103602 | 5/1987 |
| JP | 62-254594 | 11/1987 |
| JP | 1116521 | 5/1989 |
| JP | H01-116521 | 5/1989 |
| JP | 02-078393 | 3/1990 |
| JP | H04-324447 | 11/1992 |
| JP | H09-503402 | 4/1997 |
| JP | 2001-326949 | 11/2001 |
| JP | 2003-264853 | 9/2003 |
| JP | 2004-333561 | 11/2004 |
| JP | 2006-235332 | 9/2006 |
| KR | 10-1987-0001837 | 10/1987 |
| KR | 20-1996-0006160 | 7/1996 |
| KR | 10-2002-0050042 | 6/2002 |
| KR | 10-2010-0445898 | 8/2004 |
| KR | 10-2005-0102282 | 10/2005 |
| RU | 2132115 | 6/1999 |
| WO | 1998/049837 | 11/1998 |
| WO | 01/11894 | 2/2001 |
| WO | 2004/105380 | 12/2004 |
| WO | 2005/039192 | 4/2005 |
| WO | 2005/099279 | 10/2005 |
| WO | 2007/008109 | 1/2007 |
| WO | 2007/118114 | 10/2007 |
| WO | 2008/061511 | 5/2008 |

* cited by examiner

GLASSES FOR SPECTRAL AND 3D IMAGING

CROSS-REFERENCE TO RELATED APPLICATIONS

This application claims priority to U.S. Provisional Patent Application No. 62/449,477 filed on Jan. 23, 2017, which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Field of Invention

The present invention relates to viewing images including 3D images and spectral-based imaging.

Description of Related Art

Stereoscopic projection, commonly called three-dimensional (3D) projecting, delivers slightly different images to each eye of a viewer, which gives the illusion of depth when the viewer's brain assembles the two images into a single scene.

In a polarization-based 3D projection system, two projectors or a view-switching projector may be used, to project images for each eye. Polarizing filters (or a switched electronic filter) are used to polarize the light for one eye orthogonally to the other. The viewer wears glasses with corresponding polarizing filters, so that each eye receives only light projected for that eye.

In anaglyphic projection, the two images are each color-shifted, one into the red end of the visible spectrum and one into the blue end. The viewer wears glasses with red and blue filters, one for each eye, so that each eye sees only the image shifted into the corresponding color. The viewer's brain reassembles the two images into a single reduced-color image with the illusion of depth. Such a system also works with still images, which can be printed with the two color-shifted images overlaid.

A third approach projects alternating images for each eye, and glasses, for example with LCD shutters, actively block the view of the eye opposite the image currently being projected.

Yet another approach spectrally separates each image in different portions of the spectrum. Richards provides advanced selection of wavelengths specifically allocated for each eye viewing channel. However, all of the above and particularly spectral separation include a host of specific design considerations, advantages and disadvantages.

SUMMARY OF THE INVENTION

The present inventor has realized the need to improve viewing glasses by reducing or eliminating eye reflections. The present invention includes application of an absorbing layer on lens or lenses of glasses in a manner that reduces eye reflections but maintains sufficient passage of the desired image-carrying wavelengths.

The present invention includes lens coating architectures that reduce eye reflections from primary and/or secondary sources. Sources include, for example, image light intended to be viewed which is reflected off the eye or face back toward the glasses and then back toward the eye where it is viewed. Sources include, for example, image light not intended to be viewed (but may be viewed in part by the unintended eye as crosstalk) and which is reflected off the eye back toward the glasses and then back toward the eye where it is viewed as a reflection.

Other sources may include ambient light (e.g., pathway, exit lighting, booth lighting, audience mobile devices, etc.) passing through the glasses or entering around edges or from behind the glasses. Other sources include primary image light reflected off walls, clothing, and/or other glasses in the theater and around (or from behind) a viewer where it illuminates the eye (either directly or by reflection)—this includes illuminations that project toward the back side of the lenses of the glasses and are then reflected back toward the viewer. In most of these examples, the viewer will actually see his/her eye in the lens of the glasses, which, at certain levels becomes noticeable and annoying, and at least degrading the perceived image quality.

The present invention includes application of the absorptive material or layer on only one lens of a set of spectrally separated 3D glasses. In one embodiment a second lens includes a balancing absorptive layer that may impart a relatively small amount of absorption (or reflection) of desired image-carrying wavelengths. In various embodiments, the single absorptive layer is a broadband absorptive layer. In other embodiments, the absorptive layer is placed on the right eye lens and configured to absorb specific wavelengths (e.g., left-eye channel only, left eye plus controlled ambient lighting, etc.).

The present invention includes interference filters on glasses for viewing 3D images. The filters are configured to separate left and right channel projected images for each of left and right-eye viewing (e.g., the left interference filter rejects wavelengths of the right image channel and vice versa). The interference filters incorporate layers of dielectric materials. One or more of such layers may be absorptive material. The absorptive material may function alone to absorb wavelengths. The absorption material may include absorption of the same channel wavelengths. The absorptive material may be present in only one eye channel (e.g., right eye channel). The absorptive material may also function in combination with other layers to produce an interference filter specifically rejecting the opposite channel wavelengths.

The filters may be of a design configured to account for shifting of filter properties due to viewing angle. The images may be projected in laser or laser-like narrowband wavelengths. The narrowband wavelengths may be close together. The absorptive material is configured based on the image wavelengths, the accounting for filter shifts, and/or placement of the wavelengths. The amount and/or properties of the absorptive material may be based on the closeness of the narrowband wavelengths (e.g., how close right eye green wavelengths are to left eye green wavelengths). In one embodiment, an amount of absorptive materials for any one color is inversely proportional to the amount of separation between that color in each of the channels. For example, red absorptive material may be substantially reduced, in, for example, a red channel of a right eye lens separated by 15 nm from the left eye red channel, compared to a right eye green channel separated by 10 nm from left eye green channel. Specifically, the closer the opposite channel wavelength of the same color, then the greater amount of absorptive material.

The amount of absorptive material may be further allocated based on filter characteristics. In one embodiment, the amount of absorptive material can "match", or be "similar" to transmission characteristics of the filter. For example, significant unwanted light (crosstalk) can occur in a longer wavelength channel of a particular color when viewing light at off angles. With closely spaced lasers (or closely spaced narrowband lights) there may not be enough bandwidth between the lasers to effect a sufficient (or most optimally desired) guard bands between the opposite channel passbands (or notch band width if a notch band design is utilized) to fully compensate for shifts in filter properties due to off-angle viewing (e.g., oblique or low angle of incidence to the filters). It may be shown that crosstalk begins, but does not fully occur for a specific max or max designed angle of viewing (e.g., 20 degrees). In this case, crosstalk occurring at the shortest wavelength end of the passband can be abated with a smaller amount of absorptive material than wavelengths adjacent thereto. The adjacent wavelengths would receive proportionally more absorptive material in an amount proportional to the passband characteristics (or corresponding notch band structure). Such metering of absorptive material amounts may be, for example, in addition to absorptive material added to abate light entering from around or behind the lenses of the glasses. Such metering of absorptive material amounts may be, for example, in addition to absorptive material added to abate light of the same or opposite channel wavelengths entering from around or behind the lenses of the glasses. Such metering of absorptive material amounts may be, for example, in addition to broadband absorptive material added to abate light entering from around or behind the lenses of the glasses which may also tend to reduce the amount of the further metered amounts of absorptive material.

The present invention includes varying applications of absorptive material. The present invention includes a positive runout of absorptive material. In other words, absorptive coatings that increase thickness towards the edges of the lens where light passes through at oblique angles (high angles of incidence with the glass lenses—thus imparting larger shifts in filter properties).

The present invention includes biometrically varying the absorptive layer. The present invention includes a varying application of absorptive material that targets points of reflection based on parts of the eye as they are viewed in the reflection (e.g., cheeks, pupil reflection area, iris, and whites of the eye). Appropriate varying amounts of absorptive material may be applied in each areas (e.g., more in the whites of the eye area as opposed to the pupil). The present invention includes smoothly varying the amount of absorptive material from one area to the next area as one moves across the lens. Variances from one area to the next may also include an overall positive runout where the absorption material is increased (notwithstanding any biometric variation that might have an opposing effect) as one traverses from a central area of a lens toward edges of the lens.

The present invention includes two layers of absorptive material on lenses (each of the two layers may themselves be composed of multiple layers). One absorptive layer may be coated or positioned generally on a front of the lenses (toward the display/screen) and another layer coated or positioned generally on a back of the lenses. The present invention includes separate absorptive layers (e.g., generally on front and back sides of a lens) that have different absorptive properties. The layers may be on top of or integrated within other layers such as interference filter layers. The present invention includes multiple absorptive layers acting together as a single absorptive layer to reduce eye reflections.

The present invention includes depositing, sputtering, or otherwise applying or impregnating filter components onto or in the form of lenses (including contacts) utilized for viewing images. Preferably the lenses are applied to the eyes or placed into frames of glasses and utilized to view 3D images by a viewer. The present invention may be practiced by glasses composed of flexible material such as the many forms of plastic that are flexible such that, for example, they can be flexed around a 2 or 3 centimeter diameter object without stress failure. Such materials may, for example be utilized to form lenses from separate pieces of material or single continuous piece (or sheet of material) forming both "lenses" with appropriate filter and/or absorptive materials placed on each lens or areas of the single sheet corresponding to each eye.

The present invention is preferentially practiced in combination with advanced imaging systems of high brightness and high contrast, and particularly laser projection. Other systems the invention may be advantageously coupled with include highlight projectors based on laser or lower cost LED, xenon, or other technologies. Such systems are preferably tuned, adjusted, or processed (e.g., image data processing) in light of the absorption layer.

The present invention is further advantageously practiced in a dark theater with controlled ambient lighting, both brightness (low ambient brightness) and out-of-band wavelengths individually or preferably combined. The present invention is preferably practiced in combination with a dark theater which prevents additional eye reflections and yet further reflections from ambient light sources.

The present invention includes methods of making glasses with eye reflection reduction, and systems incorporating glasses with eye reflection reduction. Such systems and methods include lenses specifically manufactured or designed for reduction of eye reflection from spectrally separated images and tailored specifically to one or both of the viewer's eyes. Interior designs of a theater including "stealthflection," e.g., interiors, enclosures, seating, pods or modules (e.g., theme park ride pods) that reduce reflections toward a viewer or an audience from any direction including reduction of reflections from the side or behind where the reflection(s) can more easily enter the space between the viewer's eye and glasses lenses and contribute to eye reflections.

The invention includes every feasible combination of the above reasonably understood by the skilled artisan in light of the present disclosure and any of the other features described in more detail herein.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
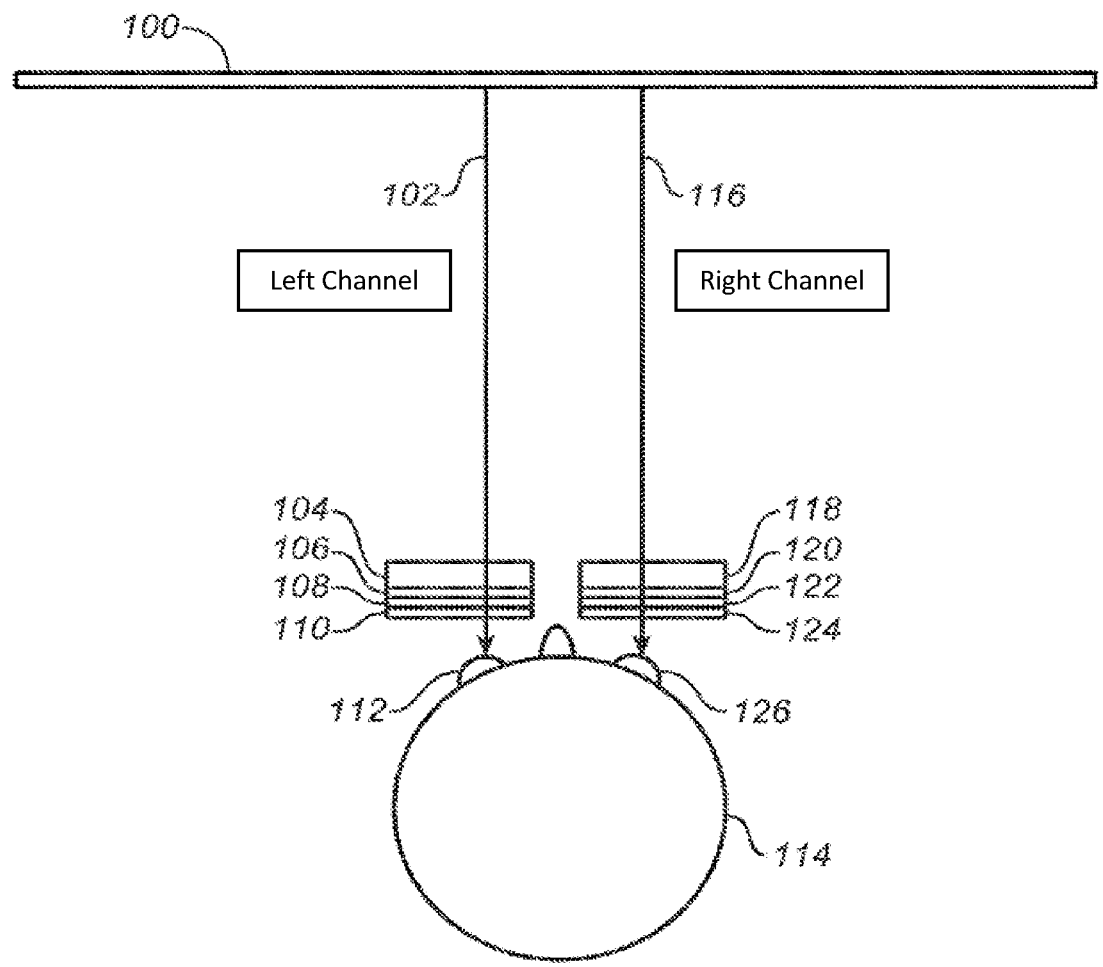
FIG. 1 is a drawing illustrating normal angle viewing of a screen 100.

Referring now to the drawings, wherein like reference numerals designate identical or corresponding parts, and more particularly to FIG. 1 thereof is a drawing illustrating normal angle viewing of a screen 100. A 3D image on the screen is viewed by a viewer 114 through left and right eye channels which comprise left view image light 102 from the screen that passes through a left eyeglass filter to the viewer's left eye 112. The left eye filter may comprise, for example, a substrate 104, a left 6P coating 106 (e.g., 3 left passbands, or left 3 primary lights, which together with 3 right passbands, or 3 right primary lights, are used to carry a 6 primary image to the viewer), a left absorptive coating 108, and a left antireflective coating 110.

In a similar overall structure, the right eye channel comprises right view image light 116 from the screen passes through a right eyeglass filter to the viewer's right eye 126. The right eye filter may comprise, for example, a substrate 118, a right 6P coating 120 (e.g., the 3 right passbands, or 3 right primary lights), a right absorptive coating 122, and a right antireflective coating 124.

Antireflective coatings 110 and 124 are optional. Absorptive coatings 108 and 122 may be included in 6P coatings 106 and 120. Absorptive coatings 108 and 122 may be used for one eye only with or without antireflection coatings.

The absorptive layer may comprise, for example, dyes, oxides, or other materials. The materials may be selected based on their absorptive effect. In various embodiments, the absorptive material is broadband and selected in a range from 3% to 25%. When provided with a 12% absorption, an 88% transmission relative to the no absorptive material cases results. When provided a 22% absorption, a 78% transmission results. The transmission is affected in a negative manner because the image to be viewed will lose some brightness due to absorption. In various embodiments, rather than broadband, selective absorbers are utilized. Selective absorbers absorb more light in specific wavelengths and are selected according to the wavelengths of light that are most problematic in causing eye reflections.

The absorptive material may be included in layers of a separately functioning interference filter or it may be stand-alone (e.g., coated on a back of glasses lenses closest to the eye). The absorptive layer may in include a plurality of substances absorbing broadband and/or specific spectral ranges. The absorptive layer may include dyes. In embodiments including absorptive layers for both eye channels, one channel may have an absorptive layer that is thicker than the other channel. The absorptive layer may be constructed using dyes or other materials known in the art. The absorptive layer may include a supramolecular configuration. The absorptive layer may be encapsulated by another layer for protection and/or integrity/stability.

As noted further above, eye reflections are a product that includes light entering the area between the lens and the viewer directly through the lens (essentially, this is what is shown by the light paths 102 and 116 in FIG. 1) and then reflecting off the eye (and immediately surrounding facial parts of the viewer) back toward the lens which is again reflected back toward the viewer where it is seen as a reflection on/in the lenses by the viewer. An immediate benefit of the reduced brightness due to the reduced transmission caused by the light passing through the absorptive layer is a corresponding reduction in brightness of the reflection from the viewer's eye back toward the lens.

Perhaps more important, the light reflected back to the lens may again encounter the absorptive layer as it travels in the direction from the eye (or other area near the eye) in a direction toward the lens, and then again (at least partially) after reflection from the lens back toward the viewer's eye. This reflection and re-reflection process may repeat at increasingly diminished brightness's until extinct, and may also include light that enters from entry points other than through the lenses. This process reflecting back and forth through the absorption layer can be enhanced by placing the absorptive layer (or layers) at the "top" of the filter stack (e.g., top of the 6P coatings, and closest to the eye) because any amount of eye reflection contributed by the filter stack itself will generally be subject to at least two passes (1. From the viewer's eye area, and 2. Returning to the viewer's eye/eye area). In the case of light initially passing through the lens, that light is then subject to 3 significant passes through the absorptive layer(s).

Figure 2:
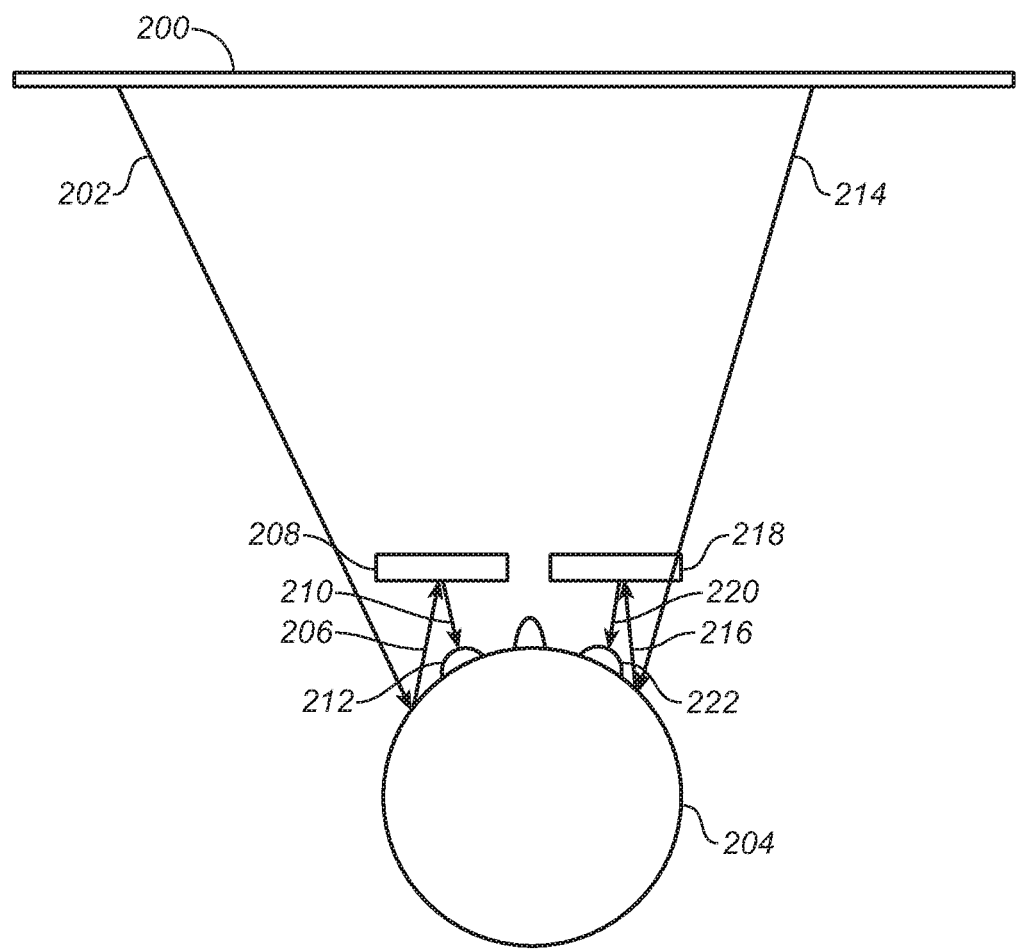
FIG. 2 is drawing illustrating leakage paths from a screen 100.

Eye reflections are also a product that may include light entering the eye area from other than through the lenses, including "around" the glasses/lenses, meaning any light that itself may be a reflection from walls, ceiling, floors, skin, clothing, secondary light sources, etc. that enters the eye area (e.g., from behind, above, below, from a side, etc.) and subject to either illuminating any portion of the eye or user's face or otherwise being subject to being reflected back into the viewer's pupil from the lens. Some examples of light entering the eye area from "around" the glasses are illustrated in FIG. 2.

In the end, depending on how much the amounts of light passes through the lens (e.g., intended image light plus crosstalk) as opposed to light entering from around the lens, the reduction in eye reflection will be between 23% to 32% for the 12% absorption example, and 39 to 54% for the 22% absorption example. The lower numbers are for leakage mostly around the lens (two passes through the absorptive layer), and the higher numbers are for leakage mostly through the lens (three passes through the absorptive layer) such as when there is significant ghosting (crosstalk) through the lens from the opposite eye channel. The through-lens leakage is the largest contributor for the eye channel hosting longer wavelengths and is particularly problematic for glasses that include neutral or, worse yet, negative runout in the properties of the filter (e.g., filter coating thickness becoming thinner as the transmission position traverses the lens from a central area to an edge of the lens). Accordingly, the invention may be advantageously applied to a single lens that corresponds to the channel having the longest wavelengths.

Figure 3:
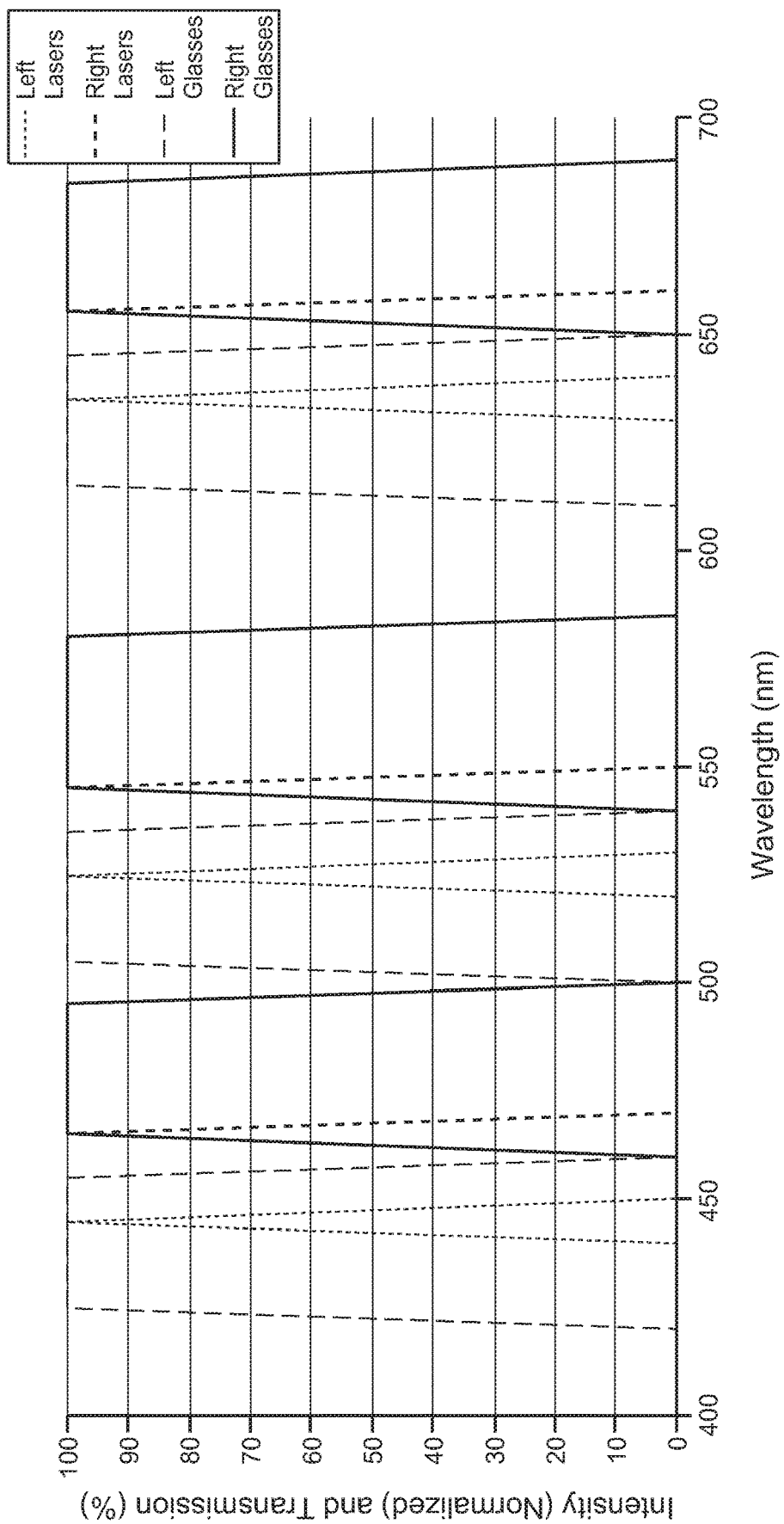
FIG. 3 is a graph of passbands and wavelengths corresponding thereto for 3D viewing of narrowband wavelengths.

For example, FIG. 3 is a graph of passbands for 3D viewing of narrowband wavelengths, which are an exemplary set of wavelengths for a 6P projector. The 6P projector may project 2D images using all 6 primary lights. The 6P projector may project 3D images where a left image is produced using B1 (425 nm), G1 (505 nm), and R1 (e.g., 635 nm), and a right image is produced using B2 (465 nm), G2 (545 nm), and R2 (655 nm). It is noted that in actual implementation, with typical layered interference filters, the filter walls are not vertical and include some gradient and variance.

Also shown are passbands for each of the primary lights, the passbands corresponding to B1 (e.g., passband at 425-455 nm), G1 (e.g., passband at 505-535 nm), and R1 (e.g., passband at 615-645), are, for example, embodied in a left eye lens as, for example, and interference filter. The passbands corresponding to B2 (e.g., 465-495 nm), G2 (e.g., 545-580 nm), and R2 (e.g., 655-685 nm) are, for example, embodied in a right eye lens.

Table 1 provides an example of laser and passband wavelengths.

TABLE 1

| Wavelength (nm) | Laser (normalized) | | Wavelength (nm) | Glasses (T %) | |
|---|---|---|---|---|---|
| | Left | Right | | Left | Right |
| 400 | 0 | 0 | 400 | 0 | 0 |
| 405 | 0 | 0 | 405 | 0 | 0 |
| 410 | 0 | 0 | 410 | 0 | 0 |
| 415 | 0 | 0 | 415 | 0 | 0 |
| 420 | 0 | 0 | 420 | 0 | 0 |
| 425 | 0 | 0 | 425 | 100 | 0 |
| 430 | 0 | 0 | 430 | 100 | 0 |
| 435 | 0 | 0 | 435 | 100 | 0 |
| 440 | 0 | 0 | 440 | 100 | 0 |
| 445 | 100 | 0 | 445 | 100 | 0 |
| 450 | 0 | 0 | 450 | 100 | 0 |
| 455 | 0 | 0 | 455 | 100 | 0 |
| 460 | 0 | 0 | 460 | 0 | 0 |
| 465 | 0 | 100 | 465 | 0 | 100 |
| 470 | 0 | 0 | 470 | 0 | 100 |
| 475 | 0 | 0 | 475 | 0 | 100 |
| 480 | 0 | 0 | 480 | 0 | 100 |
| 485 | 0 | 0 | 485 | 0 | 100 |
| 490 | 0 | 0 | 490 | 0 | 100 |
| 495 | 0 | 0 | 495 | 0 | 100 |
| 500 | 0 | 0 | 500 | 0 | 0 |
| 505 | 0 | 0 | 505 | 100 | 0 |
| 510 | 0 | 0 | 510 | 100 | 0 |
| 515 | 0 | 0 | 515 | 100 | 0 |
| 520 | 0 | 0 | 520 | 100 | 0 |
| 525 | 100 | 0 | 525 | 100 | 0 |
| 530 | 0 | 0 | 530 | 100 | 0 |
| 535 | 0 | 0 | 535 | 100 | 0 |
| 540 | 0 | 0 | 540 | 0 | 0 |
| 545 | 0 | 100 | 545 | 0 | 100 |
| 550 | 0 | 0 | 550 | 0 | 100 |
| 555 | 0 | 0 | 555 | 0 | 100 |
| 560 | 0 | 0 | 560 | 0 | 100 |
| 565 | 0 | 0 | 565 | 0 | 100 |
| 570 | 0 | 0 | 570 | 0 | 100 |
| 575 | 0 | 0 | 575 | 0 | 100 |
| 580 | 0 | 0 | 580 | 0 | 100 |
| 585 | 0 | 0 | 585 | 0 | 0 |
| 590 | 0 | 0 | 590 | 0 | 0 |
| 595 | 0 | 0 | 595 | 0 | 0 |
| 600 | 0 | 0 | 600 | 0 | 0 |
| 605 | 0 | 0 | 605 | 0 | 0 |
| 610 | 0 | 0 | 610 | 0 | 0 |
| 615 | 0 | 0 | 615 | 100 | 0 |
| 620 | 0 | 0 | 620 | 100 | 0 |
| 625 | 0 | 0 | 625 | 100 | 0 |
| 630 | 0 | 0 | 630 | 100 | 0 |
| 635 | 100 | 0 | 635 | 100 | 0 |
| 640 | 0 | 0 | 640 | 100 | 0 |
| 645 | 0 | 0 | 645 | 100 | 0 |
| 650 | 0 | 0 | 650 | 0 | 0 |
| 655 | 0 | 100 | 655 | 0 | 100 |
| 660 | 0 | 0 | 660 | 0 | 100 |
| 665 | 0 | 0 | 665 | 0 | 100 |
| 670 | 0 | 0 | 670 | 0 | 100 |
| 675 | 0 | 0 | 675 | 0 | 100 |
| 680 | 0 | 0 | 680 | 0 | 100 |
| 685 | 0 | 0 | 685 | 0 | 100 |
| 690 | 0 | 0 | 690 | 0 | 0 |
| 695 | 0 | 0 | 695 | 0 | 0 |
| 700 | 0 | 0 | 700 | 0 | 0 |

The present invention includes embodiments of very narrow wavelengths of laser light (e.g., a single wavelength), and, in other embodiments, laser lights (or other narrowband sources) that have bandwidth which can be, for example, 2-5 nm possibly more. In one embodiment, laser bandwidth includes an intensity by wavelength function such that wavelengths close to an edge of the passband have less intensity (e.g., peak laser intensity is shifted slightly away from a passband wall). In one embodiment, the intensity by wavelength function of the laser is similar to a transmissivity by wavelength function of the laser's corresponding passband, that is the laser wavelengths (e.g., at a short wavelength end of a passband when viewed normally) increase in intensity in a manner similar to increases in transmissivity of its corresponding passband. Since manufacturing tolerances and variations exist, it is understood that such implementations are similar but not exact, although more precision in the match may be advantageous.

Because off-axis viewing causes the passbands to shift blue (toward shorter wavelengths) the right eye channel in the example of FIG. 3 is more likely to experience crosstalk from the left eye channel than vice versa. Accordingly, in this example, the right eye channel benefits the most from adding the absorptive layer. The skilled artisan understands upon review of the present disclosure that other configurations of wavelengths and/or passbands, and/or blocking bands, can be utilized to effect 3D imaging and viewing, and these systems can benefit from the invention which includes all such instantiations.

As to the absorptive materials, in general, there tends to be more absorption in blue and slightly less in red for many materials (compared to green). However, in various embodiments, the invention is made to have a flat absorption (neutral density or no variation with wavelength). But blue tends to be the least expensive laser color, so more absorption in blue is easier (e.g., less expensive) to compensate for reduced brightness. The most important color to reduce eye reflection is green because of its high photopic efficacy. The present invention includes a projection system for 3D images, the system including 3D glasses comprising at least one absorption layer and wherein a brightness of images projected by the system are increased in an amount inversely proportional to a reduction in brightness of images intended to be viewed caused by the absorption layer(s). The present invention includes increasing the brightness of projected images in a single channel of a 3D projection. The present invention includes an unbalanced brightness between left and right channels of a 3D image (e.g., where a right channel image is brighter than a left channel image). The differential in brightness, for example, corresponds to a percentage reduction in transmission, as provided in various examples or any of the ranges described herein.

The present invention includes a cost differential between banks of lasers or other light sources in a 6P projector. Such differential comprises, for example, in a projector that uses 6 primary lights (e.g., 6 lasers to produce 3D images and/or 2D images for display where 2 banks of lasers each comprising 3 primary colors (e.g. 1st bank R1, G1, B1, and 2nd bank R2, G2, B2). The differential may also be in performance, specification, or cost.

The invention also includes where the differential is spread out between the banks, such that one bank has for example, the higher brightness specification (higher spec'd) green laser and the other bank includes the higher brightness spec'd red and blue lasers. In the case where only a single lens includes the absorptive layer, using a mixed spec's spec'd laser blanks, the eyeglass lens corresponding to the channel incorporating the higher spec'd green laser preferably includes the absorption layer. In the case where both lenses include absorption layers, benefit arises by adjusting the absorption layers such that they have increased absorption corresponding to the higher spec'd lights (e.g., green in one lens, and red and blue in the other lens) compared to the lower spec'd lights. And preferably when displaying 3D images, the brightness, not of the images in their entirety, but of the wavelengths subjected to decreased transmission through their corresponding glasses lenses are boosted in brightness. Such desirable requirements may be accomplished by using corresponding mixed banks of higher and lower power laser (e.g., higher and lower cost/spec'd lasers).

In one embodiment, same or similar materials as those provided in making interference filters via deposited layers may be used as absorbers. Those materials include, for example, silicon dioxide (SiO2) and niobium pentoxide (NB2O5). By reducing the oxygen pressure during deposition, absorption can be added to the materials. For example, using SiOx where x<2.

Another approach is to use a separate layer (e.g., behind an existing 6P coating stack). This approach is more effective because it captures the reflection from all the existing layers, rather than only some of them. In this case, we can also use SiOx. Traditional neutral density filter materials (which are metals such as chrome) typically have a large reflection. An additional AR coating may be added to reduce these additional reflections. Another class of absorbing materials that may be utilized is the nitrides. These include titanium nitride (TiN), niobium nitride (NbN), and others. Organic materials may be utilized but at the likely expense of durability.

The invention includes the process of making filters according to any of the above. In one embodiment, an absorptive layer is sputtered or otherwise deposited on a lens blank and then an additional filter (e.g., a corresponding eye channel of a 6P filter) is sputtered, applied, or otherwise deposited on top of the absorptive layer. Application of the additional filter may be performed by applying a pre-printed film (e.g., from a roll of film) of the appropriate optical characteristics. The film may be, for example, a thin polymer or polymer like roll of material having a triple band or triple notch/blocking interference filters corresponding to a channel of the 6P filter (6P coating). Various other configurations are of course possible and understood by the skilled artisan in light of the teachings herein.

In one embodiment, the present invention is manufactured by creating interference filter wherein the top of the filter stack (top referring to layers of the stack closest to the eye) comprises layers that themselves include absorptive material. In such an embodiment, there may be one or several layers of the filter stack that are specifically designed to increase absorption. In one embodiment, many layers of the filter stack are absorptive. In one embodiment, with multiple absorptive layers, a density of absorptive layers increases toward the top of the stack.

In one embodiment, a 6P filter is applied to lenses via a holographic technique (e.g., photo-sensitive lens material) onto the front side of the lenses and the absorptive layer is sputtered or otherwise applied to an opposite side/rear side (closest to the viewer) of the lenses. Preferably, the lens material is flexible. In one embodiment, at a minimum, the lens material exhibiting enough flexibility so that it can be placed in frames designed to hold the lenses in a predetermined curvature. The curvature of the lenses in this and other embodiments may be utilized in determining how much and/or what wavelengths the absorptive material is most effective. For example, an amount of curvature that reduces cross talk at oblique angles for all but a limited set of wavelengths of light, the absorptive material may be selected to include, increase, or, in other embodiments, exclusively absorb, that limited set of wavelengths.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. For example, when describing a 3D filter, such as an interference filter, any other equivalent device, such as dye based filters, holographic filters, or others as known to the skilled artisan may be substituted therewith and including necessary modifications if necessary as the skilled artisan will understand upon review of the invention as described herein. Accordingly, any other device having an equivalent function or capability, whether or not listed herein, may be substituted therewith. Furthermore, the inventors recognize that newly developed technologies not now known may also be substituted for the described parts and still not depart from the scope of the present invention. All other described items, including, but not limited to filters, layers, materials, lenses, glasses, theaters, projectors, absorption materials, etc should also be considered in light of any and all available equivalents.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

By way of further examples, in various embodiments, the invention comprises, and may be embodied, as, for example, viewing glasses configured to spectrally separate left and right channels of a 3D image for viewing by a viewer, the glasses comprising an absorptive layer on only one lens of the glasses. The absorptive layer may comprise a broadband absorber. Alternatively the absorptive layer may take any number of other forms individually or in combination including, for example, the absorptive layer (or layers) may coincide with wavelengths of a 3D system more subject to crosstalk than other wavelengths of the system. The absorptive layer may comprise a positive runout layer. The absorptive layer may comprise an opposite-channel-wavelengths absorber. The absorptive layer may comprise a wavelength specific absorber. The absorptive layer may comprise a layer that absorbs more of selected wavelengths than other wavelengths. The absorptive layer may comprise a layer that absorbs green wavelengths. The absorptive layer may comprise a layer that only absorbs green wavelengths. The absorptive layer may comprise a layer that absorbs a higher percentage of green wavelengths than red or blue wavelengths. The absorptive layer may include multiple absorptive layers of different properties, and the absorptive layers may be integrated into an interference filter. In combination with any of the above, the absorptive layer may include a positive runout.

The present invention includes 3D viewing glasses specifically configured for reduction of eye reflection from spectrally separated images and utilized in a dark theater. The reduction in eye reflections is accomplished via an absorption layer. The present invention includes 3D glasses utilizing 3D glasses according to any of claims 1-13, wherein at least one absorption layer is sputtered onto a lens of the glasses.

The present invention comprises 3D glasses comprising lenses comprising interference filters and an absorption layer on one lens. The absorption layer may be sputtered onto one side of the glasses and the interference filter comprises layers disposed or impregnated into lenses of the glasses. The absorption layer is placed, for example, as a final layer (or layers) of the interference, and/or comprises last layer on a lens before exiting the lens in a direction toward the viewer.

The present invention includes the afore noted methods of constructing the glasses plus variants and equivalents apparent to the skilled artisan upon review of the present disclosure.

The present invention includes a projector comprising at least 2 sets of lasers configured to produce images wherein 1 set of lasers comprises higher brightness than the other set of lasers. The present invention comprises a projector comprising at least 2 sets of lasers configured to produce images wherein one set of lasers comprises a lower cost set of lasers compared to the other set of lasers. The present invention includes a projector comprising at least 2 sets of lasers configured to produce images wherein one set of lasers comprises higher energy lasers than the other set of lasers. The present invention includes a projector comprising at least 2 sets of lasers configured to produce images wherein 1 set of lasers comprises a higher tolerance set of lasers than the other set of lasers. The projectors according to the invention may be configured to display both 2D images and 3D images, and include a processor that processes images for viewing wherein processing for 2D images is different from processing for 3D images. The different processing includes, for example, adjustments made because one bank of lasers is different from the other bank of lasers.

In displaying 3D images, using any of the projectors having different spec'd laser banks, the projector may be configured to display a first channel image of a 3D image with the lower spec'd banks of lasers and a second channel of the 3D image with the higher spec'd bank of lasers. The lower spec'd set of lasers may comprise lasers with shorter wavelengths. The projector may be part of system for displaying and viewing 3D images comprising glasses comprising an absorptive layer as discussed in the various embodiments above. The projector may be part of system for displaying and viewing 3D images comprising glasses comprising an absorptive layer in only one lens of the glasses, such as the right eye lens or the lens corresponding to a higher spec'd laser bank.

The glasses, and specifically the lens or lenses may be comprised of flexible material and the absorptive layer is behind (or part of final layers) of an interference filter configured to separate left and right channels of the 3D image.

The present invention may be embodied as system for displaying and viewing 3D images. The system may include a projector.

The present invention includes preparing video signals in advance of projection of images contained in the video signals. The preparation may include boosting luminance components in image data corresponding to viewing channel incorporating an absorption filter. The preparation may include color correction specifically tailored to each of 3D viewing channels and which in at least one channel the color correction takes into account an amount of absorption of some wavelengths and/or broadband absorption. In one embodiment, the preparation includes scene-by-scene enhancements based on characteristics of the projector including one or more of brightness capabilities, laser wavelengths, and absorption characteristics of optics such as, for example, glasses, lenses, filters and/or other components of the system.

In one embodiment, the present invention includes glasses having lenses coated with a color separation filters on a front side of the lenses (side toward the viewing screen), and an absorption filter on a rear side of the lenses of the glasses. In one embodiment, the aforementioned glasses have an absorption filter only on one of the lenses. In another embodiment, both lenses have absorption filters but one of the lenses has a higher absorption capability. The one lens (including an absorption filter or increased capability absorption filter) comprises the lens corresponding to a viewing channel more subject to crosstalk than the other channel. Being more subject to crosstalk includes a filter structure that places passbands of the lens closer to opposing channel wavelengths, or passbands in a position to shift, in off-angle viewing, closer to opposing channel wavelengths (compared to the opposite channel wavelengths or passbands) such that crosstalk occurs, begins to occur, or otherwise subjects that channel to unwanted ambient light (including opposite channel light if applicable).

The present invention includes a projector comprising at least 2 sets of lasers configured to produce images wherein one of the sets of lasers comprises a higher spec'd set of lasers than the other set of lasers. The higher spec'd set of lasers may comprise wavelengths longer than the lower spec'd set of lasers. Glasses for use with the projector may comprise an absorptive layer in a lens of the glasses corresponding to the higher spec'd bank of lasers. The projector may be a highlight projector or a high dynamic range projector.

We claim:

1. Viewing glasses comprising two lenses, the viewing glasses configured to spectrally separate left and right channels of a 3D image for viewing by a viewer, the glasses comprising an absorptive layer on only one lens of the two lenses of the glasses, wherein a thickness of the absorptive layer increases from a first thickness at a central area of the lens to a second thickness at edges of the lens, and
   wherein the absorptive layer comprises an absorber that absorbs wavelengths corresponding to a second channel, of the left and right channels, the second channel being different from a first channel corresponding to the lens having the absorptive layer.

2. The glasses according to claim 1, wherein the absorptive layer comprises a broadband absorber.

3. The glasses according to claim 1, wherein the absorptive layer comprises a wavelength specific absorber.

4. The glasses according to claim 1, wherein the absorptive layer comprises a layer that absorbs more of selected wavelengths than other wavelengths.

5. The glasses according to claim 1, wherein the absorptive layer comprises a layer that absorbs green wavelengths.

6. The glasses according to claim 1, wherein the absorptive layer comprises a layer that absorbs a higher percentage of green wavelengths than red or blue wavelengths.

7. The glasses according to claim 1 wherein the absorptive layer comprises multiple absorptive layers of different properties.

8. The glasses according to claim 1, wherein the absorptive layer comprises multiple layers located on opposing sides of the lens.

9. The glasses according to claim 1, wherein the glasses are utilized in combination with a highlight projector.

10. The glasses according to claim 1, wherein the glasses are utilized in combination with a laser projector.

11. The glasses according to claim 1, wherein the glasses are utilized in combination with an LED projector.

12. The glasses according to claim 1, wherein at least one absorption layer is sputtered onto a lens of the glasses.

13. 3D glasses comprising two lenses comprising interference filters and an absorption layer on only one of the two lenses, wherein the absorption layer is sputtered onto one side of the only one of the lenses and the interference filter comprises layers disposed or impregnated into the lenses of the glasses, wherein a thickness of the absorption layer increases from a first thickness at a central area of the lens to a second thickness at edges of the lens, and wherein the absorptive layer comprises an absorber that absorbs wavelengths corresponding to a second channel, of the left and right channels, the second channel being different from a first channel corresponding to the lens having the absorptive layer.

\* \* \* \* \*